(12) United States Patent
Kim et al.

(10) Patent No.: US 12,216,477 B2
(45) Date of Patent: Feb. 4, 2025

(54) ROBOT AND CONTROLLING METHOD THEREOF

(71) Applicant: SAMSUNG ELECTRONICS CO., LTD., Suwon-si (KR)

(72) Inventors: Dohoon Kim, Suwon-si (KR); Aron Baik, Suwon-si (KR); Chanho Yoon, Suwon-si (KR); Eunsoll Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 17/843,394

(22) Filed: Jun. 17, 2022

(65) Prior Publication Data
US 2023/0070341 A1    Mar. 9, 2023

Related U.S. Application Data

(63) Continuation of application No. PCT/KR2022/005909, filed on Apr. 26, 2022.

(30) Foreign Application Priority Data

Sep. 7, 2021   (KR) .................. 10-2021-0119323

(51) Int. Cl.
  *G05D 1/00*     (2024.01)
(52) U.S. Cl.
  CPC ......... *G05D 1/0238* (2013.01); *G05D 1/0214* (2013.01); *G05D 1/0274* (2013.01)
(58) Field of Classification Search
  CPC .. G05D 1/0238; G05D 1/0214; G05D 1/0274; G05D 1/02; G05D 1/024;
  (Continued)

(56) References Cited

U.S. PATENT DOCUMENTS 9,868,211 B2    1/2018  Williams et al.
10,639,793 B2   5/2020  Williams et al.
(Continued)

FOREIGN PATENT DOCUMENTS

CN    109271944 A    1/2019
JP    2011-128844 A  6/2011
(Continued)

OTHER PUBLICATIONS

International Search Report (ISA/210) issued Aug. 9, 2022 by the ISA for International Application No. PCT/KR2022/005909.
(Continued)

*Primary Examiner* — Bao Long T Nguyen
(74) *Attorney, Agent, or Firm* — Sughrue Mion, PLLC

(57) ABSTRACT

A robot is provided. The robot includes a driving part, a three dimensional (3D) depth sensor, a memory storing instructions, and a processor connected to the driving part, the 3D depth sensor, and the memory. The processor is configured to execute the instructions to acquire a depth image of a driving surface photographed by the 3D depth sensor while the robot is driving in a space, acquire, based on the acquired depth image, location information of a boundary area where tilt information of the driving surface is changed, acquire type information corresponding to an outside area of the boundary area based on the acquired location information of the boundary area and the changed tilt information, and control the driving part based on the acquired type information.

20 Claims, 13 Drawing Sheets

(58) Field of Classification Search
CPC .......................... G05D 1/0223; G05D 1/0246;
A47L 2201/06; A47L 2201/04; B25J
9/16; B25J 13/08; B25J 19/02; B25J
9/1666; B25J 9/1684; B25J 19/022; B25J
19/023; B25J 9/1676; G06T 7/593

See application file for complete search history.

(56) References Cited

U.S. PATENT DOCUMENTS

| | | | |
|---|---|---|---|
| 10,962,647 | B2 | 3/2021 | Shin et al. |
| 11,465,284 | B2 | 10/2022 | Williams et al. |
| 2016/0297072 | A1 | 10/2016 | Williams et al. |
| 2017/0277197 | A1* | 9/2017 | Liao .................... G06V 10/757 |
| 2018/0065253 | A1 | 3/2018 | Williams et al. |
| 2018/0149753 | A1 | 5/2018 | Shin et al. |
| 2019/0086539 | A1 | 3/2019 | Shin et al. |
| 2019/0146515 | A1* | 5/2019 | De Salvo .............. G08G 1/166 701/23 |
| 2019/0353758 | A1 | 11/2019 | Shin et al. |
| 2020/0104612 | A1 | 4/2020 | Chen et al. |
| 2020/0238520 | A1 | 7/2020 | Williams et al. |
| 2021/0055126 | A1 | 2/2021 | Tanaka et al. |
| 2021/0181347 | A1 | 6/2021 | Shin et al. |
| 2021/0199807 | A1 | 7/2021 | Shin et al. |
| 2021/0215797 | A1 | 7/2021 | Miki |
| 2022/0274636 | A1 | 9/2022 | Kinoshita et al. |
| 2023/0064687 | A1 | 3/2023 | Williams et al. |

FOREIGN PATENT DOCUMENTS

| | | |
|---|---|---|
| JP | 6704556 B2 | 6/2020 |
| JP | 2020-126691 A | 8/2020 |
| KR | 1020130045743 A | 5/2013 |
| KR | 1020170103556 A | 9/2017 |
| KR | 10-2018-0061949 A | 6/2018 |
| KR | 1020180064966 A | 6/2018 |
| KR | 1020190002152 A | 1/2019 |
| KR | 10-2019-0113226 A | 10/2019 |
| KR | 10-2114558 B1 | 5/2020 |
| KR | 10-2021-0100775 A | 8/2021 |
| KR | 10-2021-0106162 A | 8/2021 |
| WO | 2019191029 A1 | 10/2019 |
| WO | 2021/024838 A1 | 2/2021 |

OTHER PUBLICATIONS

Written Opinion (ISA/237) issued Aug. 9, 2022 by the ISA for International Application No. PCT/KR2022/005909.
Communication dated Aug. 1, 2024, issued by the European Patent Office in counterpart European Application No. 22867487.5.

* cited by examiner

FIG. 6A

| 610 | 611 | | | 612 | | |
|---|---|---|---|---|---|---|
| 0 | 0 | 0 | 0 | 2 | 4 | 6 |
| 0 | 0 | 0 | 0 | 2 | 4 | 6 |
| 0 | 0 | 0 | 0 | 2 | 4 | 6 |
| 0 | 0 | 0 | 0 | 2 | 4 | 6 |
| 0 | 0 | 0 | 0 | 2 | 4 | 6 |

ROBOT AND CONTROLLING METHOD THEREOF

CROSS-REFERENCE TO RELATED APPLICATION(S)

This application is a continuation application of International Application No. PCT/KR2022/005909, filed on Apr. 26, 2022, which is based on and claims priority to Korean Patent Application No. 10-2021-0119323, filed on Sep. 7, 2021, in the Korean Intellectual Property Office, the disclosures of which are incorporated by reference herein in their entireties.

BACKGROUND

1. Field

The disclosure relates to a robot providing a service to a user, and a controlling method thereof.

2. Description of Related Art

Recently, technologies regarding a robot that is arranged in an indoor space and provides a service to a user are being actively developed. Accordingly, a robot that identifies an object located in an indoor space by using a light detection and ranging (LIDAR) (or laser imaging, detection, and ranging) sensor, and provides a service based on information about the identified object is being commercialized. In particular, a robot may acquire information on a bottom surface that the robot is driving through a LIDAR sensor, and provide a service while driving based on the acquired information.

However, in case the bottom surface that the robot is driving includes a material having high light absorbance or a material causing diffused reflection, there is a problem that it is difficult to correctly identify the characteristic of the bottom surface only with information that can be acquired through a LIDAR sensor. Accordingly, there has been a continuous demand for a method of correctly identifying a characteristic of a bottom surface that a robot is driving, and providing an optimal service in accordance thereto.

SUMMARY

Aspects of the disclosure are to address at least the above-mentioned problems and/or disadvantages and to provide at least the advantages described below. Accordingly, an aspect of the disclosure is to provide a robot that provides a service according to the type information of a driving surface acquired based on a depth image acquired by a 3D depth sensor, and a controlling method thereof.

Additional aspects will be set forth in part in the description which follows and, in part, will be apparent from the description, or may be learned by practice of the presented embodiments.

In accordance with an aspect of an example embodiment, a robot may include a driving part, a three dimensional (3D) depth sensor, a memory storing instructions, and a processor connected to the driving part, the 3D depth sensor, and the memory. The processor may be configured to execute the instructions to acquire a depth image of a driving surface photographed by the 3D depth sensor while the robot is driving in a space, acquire, based on the acquired depth image, location information of a boundary area where tilt information of the driving surface is changed, acquire type information corresponding to an outside area of the boundary area based on the acquired location information of the boundary area and the changed tilt information, and control the driving part based on the acquired type information.

The processor may be further configured to execute the instructions to acquire map data including a plurality of cells and height information corresponding to the plurality of cells based on the depth image, and acquire the location information of the boundary area and the changed tilt information based on the height information of the plurality of cells of the acquired map data.

The processor may be further configured to execute the instructions to map the type information to the plurality of cells of the outside area, update the map data, identify a driving route of the robot based on the updated map data, and control the driving part based on the identified driving route.

The processor may be further configured to execute the instructions to group the plurality of cells into at least one group based on the height information of the plurality of cells included in the map data, identify cells corresponding to the outside area based on the height information of cells belonging to the at least one group, and identify a type of the outside area based on the height information of the cells identified as corresponding to the outside area.

The processor may be further configured to execute the instructions to, based on the changed tilt information being less than a first threshold value, identify the outside area as a cliff type, based on the changed tilt information exceeding the first threshold value and being less than a second threshold value, identify the outside area as a slope type, and based on the changed tilt information being greater than or equal to the second threshold value, identify the outside area as a wall type.

The processor may be further configured to execute the instructions to, based on depth information corresponding to the outside area not being acquired based on the depth image, identify that the changed tilt information is less than the first threshold value.

The processor may be further configured to execute the instructions to, based on the outside area being identified as the cliff type, set an area within a threshold distance from the boundary area as a safe area and control the driving part such that the robot does not drive into the safe area.

The processor may be further configured to execute the instructions to, based on the outside area being identified as the slope type, identify whether the outside area can be climbed by the robot based on tilt information corresponding to the outside area, and based on the outside area being identified as a climbable area, control the driving part such that a speed of the robot increases based on reaching a threshold distance from the boundary area.

The processor may be further configured to execute the instructions to, based on the outside area being identified as a non-climbable area, control the driving part such that the robot drives based on a route avoiding the outside area.

In accordance with an aspect of an example embodiment, a non-transitory computer-readable recording medium may store instructions that, when executed by a processor of a robot, cause the processor to acquire a depth image of a driving surface while the robot is driving in a space, acquire, based on the acquired depth image, location information of a boundary area where tilt information of the driving surface is changed, acquire type information corresponding to an outside area of the boundary area based on the acquired location information of the boundary area and the changed tilt information, and drive the robot based on the acquired type information.

In accordance with an aspect of an example embodiment, a controlling method of a robot may include acquiring a depth image of a driving surface while the robot is driving in a space, acquiring, based on the acquired depth image, location information of a boundary area where tilt information of the driving surface is changed, acquiring type information corresponding to an outside area of the boundary area based on the acquired location information of the boundary area and the changed tilt information, and driving the robot based on the acquired type information.

The acquiring the location information of the boundary area may include acquiring map data including a plurality of cells and height information corresponding to the plurality of cells based on the depth image, and acquiring the location information of the boundary area and the changed tilt information based on the height information of the plurality of cells of the acquired map data.

The driving the robot may include mapping the type information to cells included in the outside area, updating the map data, identifying a driving route of the robot based on the updated map data, and driving the robot based on the identified driving route.

The acquiring the type information corresponding to the outside area may include grouping the plurality of cells into at least one group based on the height information of the plurality of cells of the map data, identifying cells corresponding to the outside area based on height information of cells belonging to the at least one group, and identifying a type of the outside area based on the height information of the cells identified as the outside area.

The acquiring the type information corresponding to the outside area may include based on the changed tilt information being less than a first threshold value, identifying the outside area as a cliff type, based on the changed tilt information exceeding the first threshold value and being smaller than a second threshold value, identifying the outside area as a slope type, and based on the changed tilt information being greater than or equal to the second threshold value, identifying the outside area as a wall type.

Other aspects, advantages, and salient features of the disclosure will become apparent to those skilled in the art from the following detailed description, which, taken in conjunction with the annexed drawings, discloses various embodiments of the disclosure.

According to the various embodiments of the disclosure, a robot may identify a characteristic of a driving surface more correctly and provide a service based on an optimal driving route, and thus a user's convenience can be improved.

BRIEF DESCRIPTION OF THE DRAWINGS

The above and other aspects, features, and advantages of certain embodiments of the disclosure will be more apparent from the following description taken in conjunction with the accompanying drawings, in which:

The above and other aspects, features, and advantages of certain embodiments of the present disclosure will be more apparent from the following description taken in conjunction with the accompanying drawings, in which:

FIGS. 6A and 6B are diagrams illustrating a method of determining whether a robot can climb an area according to an example embodiment;

Throughout the drawings, it should be noted that like reference numbers are used to depict the same or similar elements, features, and structures.

DETAILED DESCRIPTION

Figure 1:
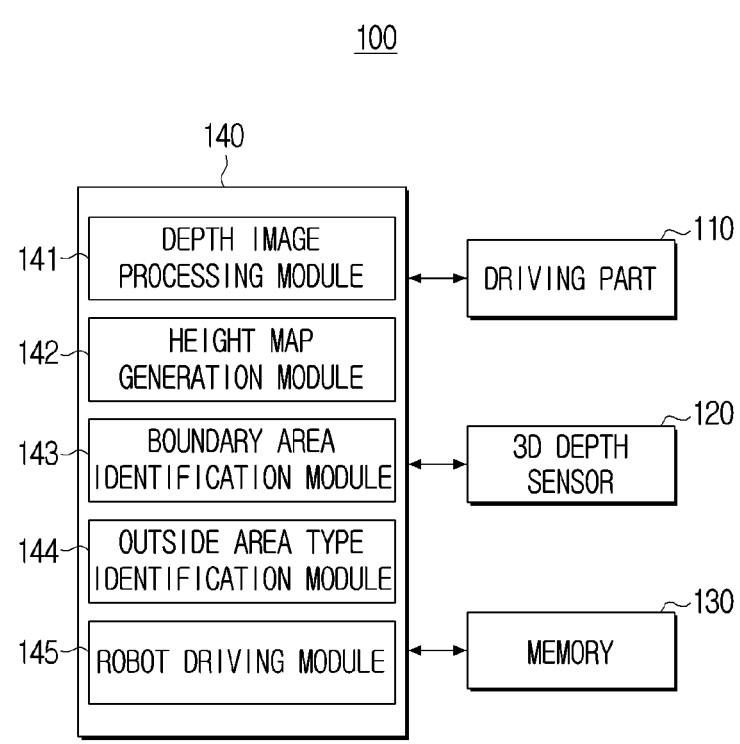
FIG. 1 is a block diagram illustrating a functional configuration of a robot according to an example embodiment.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second" and the like used in the disclosure may be used to describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions, as long as they do not obviously mean differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

Also, in the disclosure, 'a user' may mean a person who is provided with a service from a robot, but the term is not limited thereto.

FIG. 1 is a block diagram illustrating a functional configuration of a robot according to an example embodiment.

According to FIG. 1, a robot 100 may include a driving part 110, a three dimensional (3D) depth sensor 120, a memory 130, and a processor 140.

The robot 100 according to an embodiment of the disclosure may provide a service to a user while driving in a specific space. For example, the robot 100 may provide a cleaning service, a serving service, a guide service, etc., but the disclosure is not limited thereto.

The driving part 110 is a device that can make the robot 100 drive. The driving part 110 may adjust a driving direction and a driving speed according to control by the processor 140, and the driving part 110 according to an embodiment may include a power generation device (e.g., a gasoline engine, a diesel engine, a liquefied petroleum gas (LPG) engine, an electric motor, etc. according to the used fuel (or the energy source)) that generates power for the robot 100 to drive, a steering device (e.g., manual steering, hydraulics steering, electronic control power steering (EPS), etc.) for adjusting a driving direction, a driving device (e.g., wheels, a propeller, etc.) making the robot 100 drive according to power, etc. Here, the driving part 110 may be implemented while being modified according to the driving type (e.g., a wheel type, a walking type, a flying type, etc.) of the robot 100.

The 3D depth sensor 120 may acquire depth data. Specifically, the 3D depth sensor 120 may measure a depth value between the location of the robot 100 and a location of an object, and acquire depth information based on the measurement result. The 3D depth sensor 120 according to an embodiment may include at least one of a Light Detection And Ranging (LIDAR) sensor, a Time of Flight (TOF) sensor, or a plurality of infrared cameras, but the disclosure is not limited thereto.

The memory 130 may store data necessary for the various embodiments of the disclosure. The memory 130 may be implemented in a form of a memory embedded in the robot 100, or implemented in a form of a memory that can be attached to or detached from the robot 100 according to the use of the stored data. For example, in the case of data for the operation of the robot 100, the data may be stored in a memory embedded in the robot 100, and in the case of data for an extended function of the robot 100, the data may be stored in a memory that can be attached to or detached from the robot 100. In the case of a memory embedded in the robot 100, the memory may be implemented as at least one of a volatile memory (e.g.: a dynamic random access memory (RAM) (DRAM), a static RAM (SRAM), or a synchronous dynamic RAM (SDRAM), etc.) or a non-volatile memory (e.g.: an one time programmable read-only memory (ROM) (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the robot 100, the memory may be implemented in a form such as a memory card (e.g.: compact flash (CF), secure digital (SD), micro secure digital (Micro-SD), mini secure digital (Mini-SD), extreme digital (xD), a multi-media card (MMC), etc.) and an external memory that can be connected to a universal serial bus (USB) port (e.g., a USB memory), etc.

The processor 140 controls the overall operations of the robot 100. Specifically, the processor 140 may be connected with each component of the robot 100, and control the overall operations of the robot 100. For example, the processor 140 may be connected with the driving part 110, the 3D depth sensor 120, and the memory 130, and control the operations of the robot 100.

According to an embodiment, the processor 140 may be referred to by various names such as a digital signal processor (DSP), a microprocessor, a central processing unit (CPU), a micro controller unit (MCU), a micro processing unit (MPU), a neural processing unit (NPU), a controller, an application processor (AP), etc., but in this specification, it will be described as the processor 140.

The processor 140 may be implemented as a System on Chip (SoC) or large scale integration (LSI), or implemented in the form of a field programmable gate array (FPGA). Also, the processor 140 may include a volatile memory such as an SRAM, etc.

Figure 2:
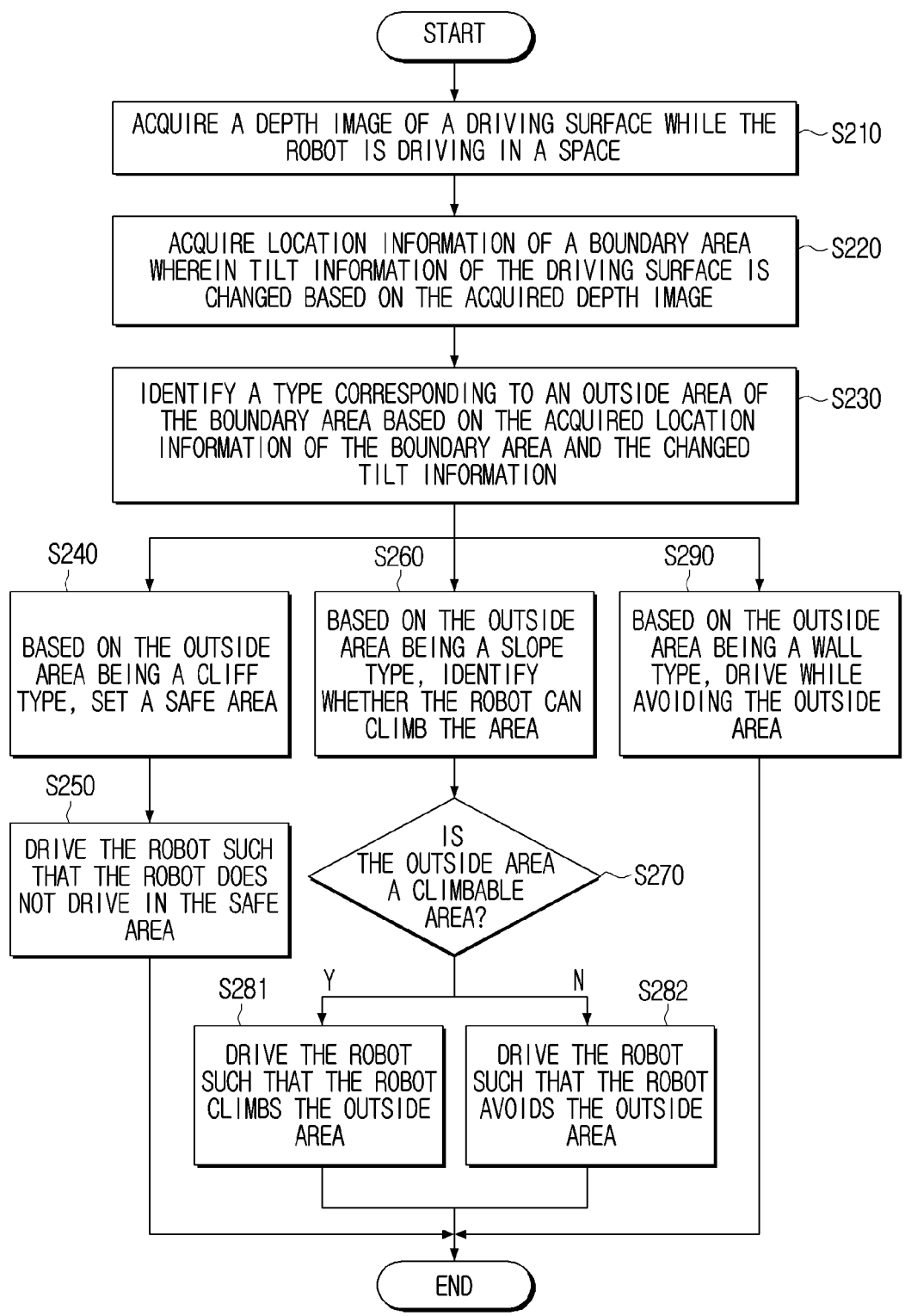
FIG. 2 is a flowchart illustrating a driving operation of a robot according to an example embodiment.

FIG. 2 is a flowchart illustrating a driving operation of a robot according to an example embodiment.

Referring to FIG. 2, the processor 140 may include a depth image processing module 141, a height map generation module 142, a boundary area identification module 143, an outside area type identification module 144, and a robot driving module 150. Each of these modules may be a software module stored in the memory 130, or a hardware module implemented in a circuit form on the robot 100. Alternatively, each of these modules may be implemented in a form where software and hardware are combined.

The processor 140 according to an embodiment of the disclosure may acquire a depth image of a driving surface while the robot 100 is driving in a space in operation S210. Specifically, the depth image processing module 141 may acquire a depth image of a driving surface based on depth information for the driving surface photographed by the 3D depth sensor 120 while the robot 100 is driving in a space. Here, the depth image may include a plurality of 3D point clouds respectively corresponding to a plurality of depth values acquired by the 3D depth sensor 120.

Also, the processor 140 may acquire location information of a boundary area where tilt information of the driving surface is changed based on the acquired depth image in operation S220. Specifically, the processor 140 may generate a height map corresponding to the space where the robot 100 is driving based on the acquired depth image, and identify at least one boundary area where the tilt information of the driving surface is changed based on the generated height map.

The height map generation module 142 may generate a height map including a plurality of cells included in the space where the robot 100 is driving and height information corresponding to the plurality of respective cells based on the acquired depth image. For example, the height map generation module 142 may acquire map data including the height information of the driving surface corresponding to the plurality of respective cells based on the depth information corresponding to the 3D point clouds included in the plurality of cells, the angle of view of the 3D depth sensor 120, and the height information of the 3D depth sensor 120.

Here, the height map generation module 142 may identify a plane corresponding to the area where the robot 100 is currently driving based on the plurality of 3D point clouds included in the depth image acquired by the depth image processing module 141.

For example, the height map generation module 142 may identify a plane corresponding to the area where the robot 100 is driving based on a RANdom SAmple Consensus (RANSAC) algorithm. Specifically, the height map generation module 142 may repeat operations of randomly extracting three point clouds among the plurality of 3D point clouds, identifying a plane including the extracted three point clouds, and calculating the number of point clouds located within a threshold distance from the identified plane, and identify a plane including the most point clouds within the threshold distance as the plane corresponding to the area where the robot 100 is driving.

Also, the height map generation module 142 may identify that at least one cell corresponding to the identified plane among the plurality of cells included in the space where the robot 100 is driving has a height of '0,' and generate a height map.

The boundary area identification module 143 may acquire location information of the area where the tilt information of the driving surface is changed based on the acquired map data. Here, the tilt information may include information regarding an angle that the driving surface constitutes with the horizontal plane, but the disclosure is not limited thereto. For example, the tilt information corresponding to the driving surface in parallel with the horizontal plane may include tilt information corresponding to 0 degree, and the tilt information corresponding to the driving surface having a tilt of 30 degrees compared to the horizontal plane may include tilt information corresponding to 30 degrees.

The boundary area identification module 143 according to an embodiment may identify a boundary area based on the height information for the plurality of respective cells included in the acquired map data, and acquire location information of the boundary area based on location information of at least one cell where the identified boundary area is included.

Also, even in case a height map was not acquired, the boundary area identification module 143 may identify location information of the boundary area based on the depth image. For example, the boundary area identification module 143 may identify at least one boundary area based on the depth information corresponding to the plurality of respective 3D point clouds included in the depth image, and acquire location information corresponding to the identified boundary area based on the location information of the robot 100 and the angle of view of the 3D depth sensor 120.

In addition, the boundary area may be an area including at least one cell among the plurality of cells included in the height map corresponding to the space where the robot 100 is driving. Specifically, the boundary area identification module 143 may acquire location information of the point where the tilt information of the driving surface is changed, and identify that at least one cell including the point is included in the boundary area.

Also, the processor 140 may identify the type corresponding to the outside area of the boundary area based on the acquired location information of the boundary area and the changed tilt information in operation S230.

Specifically, the outside area type identification module 144 may acquire type information corresponding to the outside area of the boundary area based on the acquired location information of the boundary area and the tilt information changed based on the boundary area. Here, the outside area of the boundary area may refer to at least one area sharing the area where the robot 100 is driving and the boundary area. For example, the outside area may be an area including the area where the robot 100 is located and an adjacent tilted surface in case the robot 100 is driving in an area in parallel with the horizontal plane, but the disclosure is not limited thereto.

Also, the outside area type identification module 144 may group the plurality of respective cells into at least one group based on the height information of the plurality of respective cells included in the height map generated by the height map generation module 142. For example, the outside area type identification module 144 may group a plurality of cells having the same height information, a plurality of cells where the difference in heights among adjacent cells is regular, or a plurality of cells of which height information was not acquired respectively into separate groups.

In addition, the outside area type identification module 144 may identify the type information of the outside area corresponding to an identified group based on height information corresponding to a plurality of cells included in at least one group that was grouped. For example, the outside area type identification module 144 may identify that the plurality of cells where the difference in heights among adjacent cells is regular belong to one group, and identify that the type of the outside area corresponding to the group is a slope type. Also, the outside area type identification module 144 may identify that the plurality of cells of which height information was not acquired belong to one group, and identify that the type of the outside area corresponding to the group is a cliff type.

If the tilt information of the driving surface changed based on the identified boundary area is less than a first threshold value, the outside area type identification module 144 according to an embodiment may identify the outside area as a cliff type, and if the tilt information exceeds the first threshold value and is less than a second threshold time, identify the outside area as a slope type, and if the tilt information is greater than or equal to the second threshold value, identify the outside area as a wall type, respectively. Here, the first threshold value may be 0 degrees, and the second threshold value may be 90 degrees, but the disclosure is not limited thereto.

Here, in case depth information corresponding to the outside area is not acquired based on the depth image acquired by the depth image processing module 141, the outside area type identification module 144 may identify that the changed tilt information is less than the first threshold value, and identify that the outside area for which depth information was not acquired is a cliff type. However, the operation of identifying the type of the outside area described above is merely an example, and it is obvious that the outside area type identification module 144 can identify the type of the outside area based on various methods other than what is described above.

The height map generation module 142 may update the height map based on the location information corresponding to at least one boundary area acquired by the boundary area identification module 143 and the type information corresponding to at least one outside area acquired by the outside area type identification module 144. Here, updating may mean an operation of mapping the location information corresponding to the boundary area and the type information of the outside area to the plurality of respective cells included in the existing height map and storing the information, but the disclosure is not limited thereto.

Also, the robot driving module 145 may control the driving part 110 based on the type information of the outside area acquired by the outside area type identification module 144. Specifically, the robot driving module 145 may identify a driving route of the robot 100 based on the height map updated by the height map generation module 142, and control the driving part 110 such that the robot 100 drives based on the identified driving route.

If the outside area is a cliff type, the processor 140 according to an embodiment may set a safe area in operation S240. Specifically, if the outside area is identified as a cliff type, the robot driving module 145 may set an area within a threshold distance from the boundary area as a safe area.

Also, the processor 140 may drive the robot 100 such that the robot 100 does not drive in the safe area in operation S250. Specifically, the robot driving module 145 may identify the driving route of the robot 100 such that the robot 100 does not drive in the safe area, and control the driving part 110 such that the robot 100 drives based on the identified driving route.

Further, if the outside area is a slope type, the processor 140 may identify whether the robot 100 can climb the outside area in operation S260. Specifically, if the outside area is identified as a slope type, the robot driving module 145 may identify whether the outside area is an area that can be climbed by the robot 100 based on the tilt information corresponding to the outside area.

For example, in case the tilt of the outside area identified as a slope type is less than the third threshold value, the robot driving module 145 may identify whether the outside area is an area that can be climbed by the robot 100 in operation S270. Further, the robot driving module 145 may identify whether the outside area is an area that can be climbed by the robot 100 by considering a form factor of the robot 100 and the tile information of the outside area.

Also, in case the outside area is an area that can be climbed by the robot 100 in operation S270:Y, the processor 140 may drive the robot 100 such that the robot 100 can climb the outside area in operation S281. Specifically, the robot driving module 145 may identify a boundary area of the outside area identified to be climbable by the robot 100 and the area where the robot 100 is currently driving, and when the robot 100 reaches the threshold distance from the boundary area, the processor 140 may control the driving part 110 such that the speed of the robot 100 is increased.

In contrast, in case the outside area is an area that cannot be climbed by the robot 100 in operation S270:N, the processor 140 may drive the robot 100 such that the robot 100 avoids the outside area in operation S282. Specifically, the robot driving module 145 may identify the driving route of the robot 100 such that the robot 100 drives while avoiding the outside area identified to be not climbable, and control the driving part 110 such that the robot 100 drives based on the identified driving route.

Also, if the outside area is a wall type, the processor 140 may drive the robot 100 such that the robot 100 avoids the outside area in operation S290. For example, in case the tilt corresponding to the area where the robot 100 is currently driving is 0 degrees, and the tilt corresponding to the outside area of the boundary area identified by the boundary area identification module 143 is 90 degrees, the outside area type identification module 144 may identify that the outside area is a wall type.

Also, the robot driving module 145 may control the driving part 110 such that the robot 100 avoids the outside area identified as a wall type.

As described above, the robot 100 according to the various embodiments of the disclosure may identify an outside area having different tilt information from the area where the robot 100 is currently driving, and drive based on an optimal driving route identified according to the type of the outside area, and thus a user's convenience who is provided with a service from the robot 100 can be improved.

Figure 3A:
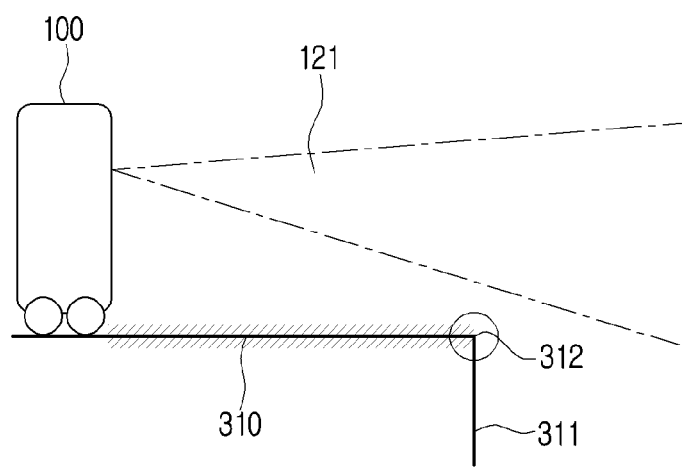
FIGS. 3A, 3B and 3C are diagrams illustrating an operation of identifying a boundary area according to an example embodiment.
Figure 3B:
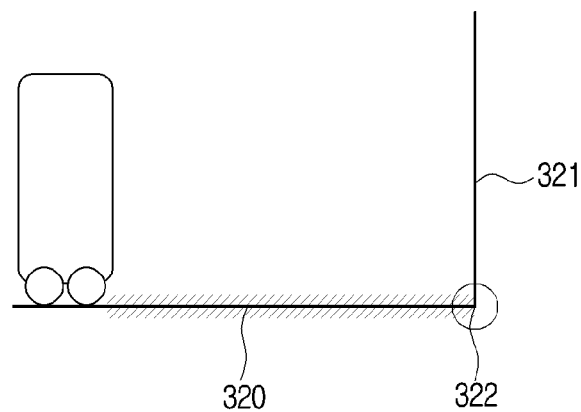
Figure 3C:
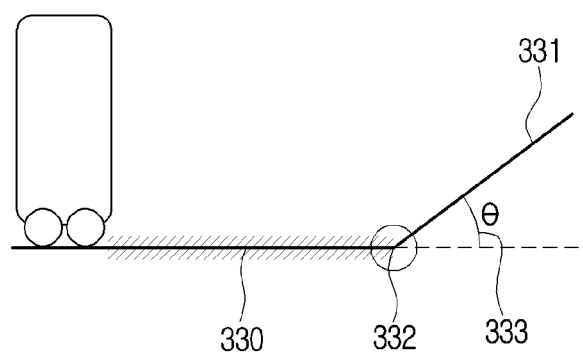

FIGS. 3A, 3B and 3C are diagrams illustrating an operation of identifying a boundary area according to an example embodiment.

According to FIG. 3A, the robot 100 may acquire a depth image of the bottom surface 310 through the 3D depth sensor 120. Here, the bottom surface 310 may be a surface that is in parallel with the horizontal plane, and this is the same for the cases of the bottom surfaces 320, 330 that will be described in FIG. 3B and FIG. 3C, but the disclosure is not necessarily limited thereto. Also, the driving surface may be a surface including the bottom surfaces 310, 320, 330 and the outside areas 331, 332, 333.

The 3D depth sensor 120 according to an embodiment does not have a regular angle of view 121, and thus the robot 100 may not acquire an image for the area 311 over the specific point 312 in the depth image corresponding to the driving direction.

Accordingly, the robot 100 may identify a boundary area including the last point 312 where depth information was acquired in the depth image corresponding to the driving direction, and acquire type information corresponding to the outside area 311 of the identified boundary area. Based on the depth information corresponding to the outside area 311 of the boundary area not being acquired, the robot 100 may identify that the outside area 311 is a cliff type.

According to FIG. 3B, the robot 100 may acquire information on planes respectively corresponding to the bottom surface 320 and the wall surface 321 and location information of the boundary area based on the RANSAC algorithm. For example, the robot 100 may acquire tilt information for each plane corresponding to the bottom surface 320 and the wall surface 321, and based on identifying that the tilt information corresponding to the bottom surface 320 and the tilt information corresponding to the wall surface 321 are different, the robot 100 may acquire location information of the point 322 where the tilt information of the driving surface is changed.

Also, the robot 100 may identify a boundary area including the point 322 where the tilt information is changed, and acquire the type information corresponding to the outside area 321 based on the location information of the boundary area and the tilt information of the outside area 321. According to an embodiment, based on identifying that the tilt of the outside area 321 is 90 degrees, the robot 100 may identify that the outside area 321 is a wall type.

According to FIG. 3C, the robot 100 may acquire information on planes respectively corresponding to the bottom surface 330 and the tilted surface 331 and location information of the boundary area. For example, the robot 100 may acquire tilt information for each plane corresponding to the bottom surface 330 and the tilted surface 331, and based on identifying that the tilt information corresponding to the bottom surface 330 and the tilt information corresponding to the tilted surface 331 are different, the robot 100 may acquire location information of the point 332 where the tilt information of the driving surface is changed.

Also, the robot 100 may identify a boundary area including the point 332 where the tilt information is changed, and acquire the type information corresponding to the outside area 331 based on the location information of the boundary area and the tilt information of the outside area 331. According to an embodiment, based on identifying that the tilt 333 of the outside area 331 exceeds 0 degrees and is less than 90 degrees, the robot 100 may identify that the outside area 331 is a slope type.

According to an embodiment, the robot 100 may identify whether the outside area 331 is a climbable area based on the tilt 333 of the outside area 331. Specifically, the robot 100 may identify whether the outside area 331 is an area that can be climbed by the robot 100 based on whether a plurality of conditions for climbing are satisfied such as the tilt 333 of the outside area 331, the form factor of the robot 100, the current speed of the robot 100, and the characteristic of the bottom surface 330 or the tilted surface 331, etc.

If it is identified that the outside area 331 is an area that can be climbed by the robot 100, the processor 140 may control the driving part 110 such that the robot 100 accelerates when it reaches the threshold distance from the point 332 included in the boundary area. In contrast, if the outside area 331 is identified as an area that cannot be climbed by the robot 100, the processor 140 may control the driving part 110 such that the robot 100 drives based on a route avoiding the outside area 331.

Figure 4:
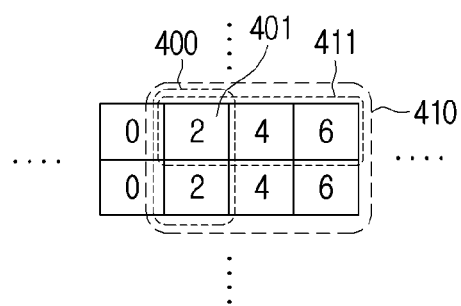
FIG. 4 is a diagram illustrating a method of grouping an outside area according to an example embodiment.

FIG. 4 is a diagram illustrating a method of grouping an outside area according to an example embodiment.

FIG. 4 illustrates a part of a plan view regarding map data including a plurality of cells included in a space where the robot 100 is driving and height information corresponding to the plurality of respective cells (hereinafter, referred to as height map data).

The processor 140 according to an embodiment may acquire height information corresponding to individual cells based on a depth image acquired by the 3D depth sensor 120. For example, the processor 140 may acquire height information based on a plurality of point clouds corresponding to the individual cells included in the depth image. Specifically, the processor 140 may acquire height information for the plurality of respective cells based on at least one of the average value or the median value of the heights of the plurality of respective point clouds corresponding to the individual cells, but the disclosure is not limited thereto.

According to FIG. 4, a part of the space where the robot 100 is driving may include a geographical feature that the height increases from the left side direction to the right side direction of the plan view. The robot 100 may identify an area including at least one cell of which height is 0 or an area including cells in greater than or equal to a threshold number having the same height as an area corresponding to the bottom surface.

Also, the robot 100 may acquire location information of a boundary area where tilt information of the driving surface is changed based on the height information corresponding to the plurality of cells. For example, the processor 140 may identify a gathering 400 of cells having different height information from the bottom surface among the plurality of cells adjacent to the area corresponding to the bottom surface having a height of 0 as the boundary area, and acquire location information of the identified boundary area.

According to FIG. 4, the processor 140 may identify a gathering of cells arranged in a vertical direction on the right side of the area corresponding to the bottom surface as the boundary area 400. The processor 140 according to an embodiment may identify a gathering 411 of a plurality of cells which include a specific cell 401 included in the boundary area 400 and which are arranged in a direction perpendicular to the boundary area 400 as a first cell line.

Also, the processor 140 may acquire tilt information of the first cell line 411 based on height information corresponding to the plurality of cells included in the first cell line 411. Specifically, the processor 140 may identify the tilt information of the first cell line 411 based on the sizes of the respective cells included in the first cell line 411 and height information corresponding to the respective cells. For example, based on the fact that the cells included in the first cell line 411 have a difference in height of 2, the processor 140 may identify that the first cell line 411 has a tilt of 30 degrees.

Also, the processor 140 may identify a second cell line to an nth cell line which include cells included in the boundary area 400 and at least one cell arranged in a direction in parallel to the first cell line 411, and which have a tilt within a threshold error range from the tilt of the first cell line 411, and identify a gathering 410 of the plurality of identified cell lines as an independent outside area.

Further, based on the fact that the plurality of cell lines included in the identified outside area 410 have a tilt within the threshold range from 30 degrees, the processor 140 may identify that the outside area 410 is a slope type, and identify whether the robot 100 can climb the outside area 410 based on the tilt information of the outside area 410 and the form factor of the robot 100.

Figure 5:
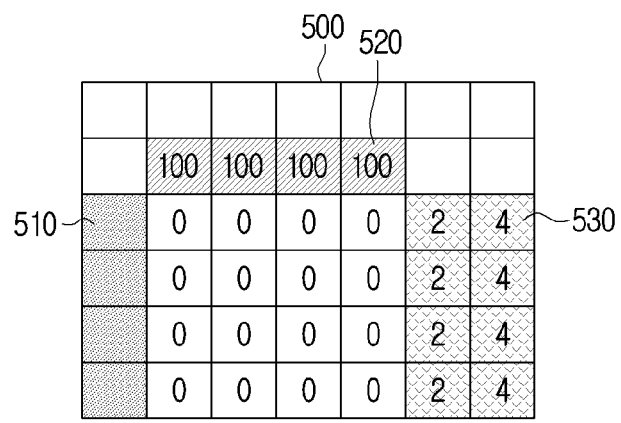
FIG. 5 is a diagram illustrating a method of updating a height map according to an example embodiment.

FIG. 5 is a diagram illustrating a method of updating a height map according to an example embodiment.

According to FIG. 5, the processor 140 may acquire map data 500 of the height map of the space where the robot 100 is driving. Here, the processor 140 may identify that the height for a gathering 520 of cells identified to have a height exceeding a threshold height is a predetermined height. For example, the processor 140 may identify that the height corresponding to the gathering 520 of the identified cells is 100, but the disclosure is not limited thereto.

Also, the processor 140 may identify a plurality of outside areas 510, 520, 530 based on the acquired map data 500, and identify the types of the respective areas based on tilt information of the identified outside areas 510, 520, 530.

According to an embodiment, the processor 140 may identify that the first area 510 for which depth information for the area was not acquired, and thus height information of the area based on it was not acquired is a cliff type. Also, the processor 140 may identify that the second area 520 where the height of the area is the predetermined height is a wall type, and identify that the third area 530 having a tilt within the threshold range from 30 degrees is a slope type.

In addition, the processor 140 may map the respective type information acquired for the cells included in the respective areas 510, 520, 530 and update the map data 500, and control the driving part 110 such that the robot 100 drives on a driving route identified based on the updated map data 500.

Figure 6A:
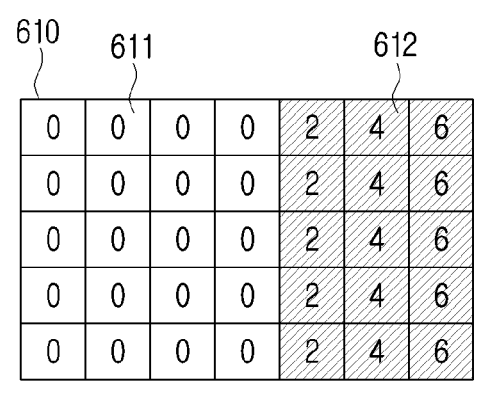
Figure 6B:
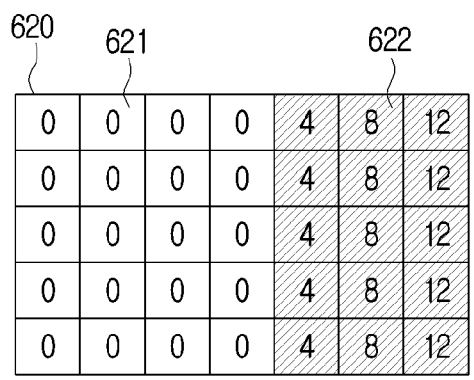

FIGS. 6A and 6B are diagrams illustrating a method of determining whether a robot can climb an area according to an example embodiment.

According to FIG. 6A, height map data 610 for a first space may include a first area 611 corresponding to a bottom surface and a second area 612 corresponding to a tilted surface. The robot 100 may acquire location information of a boundary area where tilt information of a driving surface is changed and tilt information of the second area 612. Here, the boundary area may include a gathering of a plurality of cells having a height of 2 among the cells included in the second area 612.

Also, in case the robot 100 identifies that the type of the second area 612 is a slope type based on the acquired information, the robot 100 may determine whether the robot 100 can climb the tilted surface 612 based on whether a plurality of conditions for climbing are satisfied such as the tilt information of the second area 612, the form factor of the robot 100, the current speed of the robot 100, and the characteristic of the bottom surface 611 or the tilted surface 612, etc.

For example, based on whether the plurality of conditions for climbing are satisfied, the robot 100 may determine that the robot 100 can climb the tilted surface 612 having a tilt of 30 degrees. In this case, the processor 140 may control the driving part 110 such that the robot 100 accelerates when it reaches the threshold distance from the boundary area.

According to FIG. 6B, map data 620 regarding a second space may include a first area 621 corresponding to a bottom surface and a second area 622 corresponding to a tilted surface. The robot 100 may acquire location information of a boundary area where tilt information of a driving surface is changed and tilt information of the second area 622. Here, the boundary area may include a gathering of a plurality of cells having a height of 4 among the cells included in the second area 622.

Also, in case the robot 100 identifies that the type of the second area 622 is a slope type based on the acquired information, the robot 100 may determine whether the robot 100 can climb the tilted surface 622 based on whether a plurality of conditions for climbing are satisfied such as the tilt information of the second area 622, the form factor of the robot 100, the current speed of the robot 100, and the characteristic of the bottom surface 621 or the tilted surface 622, etc.

For example, based on whether the plurality of conditions for climbing are satisfied, the robot 100 may determine that the robot 100 cannot climb the tilted surface 622 having a tilt of 50 degrees. In this case, the processor 140 may control the driving part 110 such that the robot 100 drives based on a route avoiding the outside area 622.

Figure 7A:
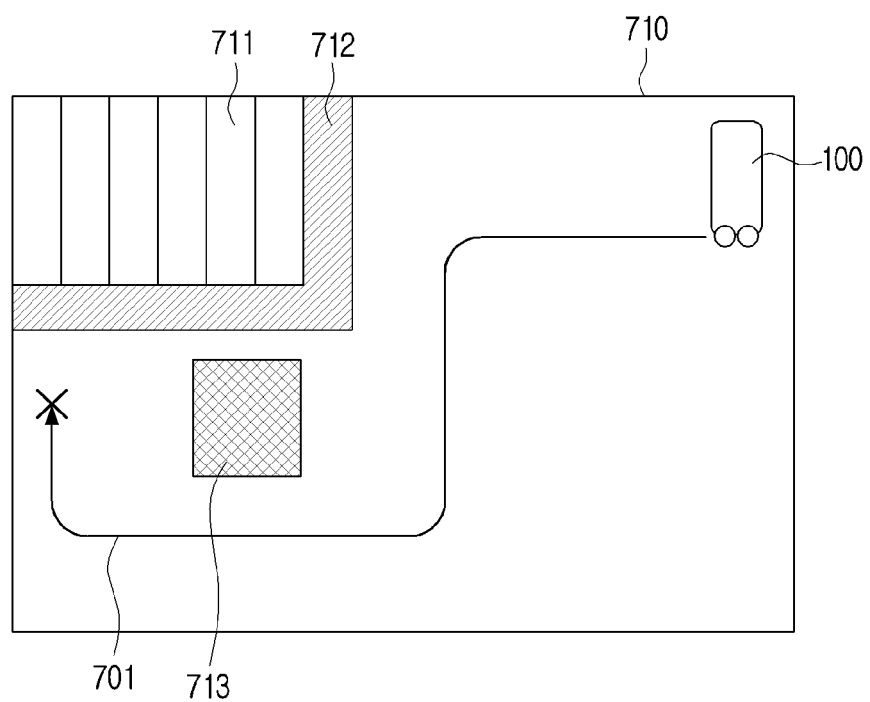
FIGS. 7A and 7B are diagrams illustrating a method of identifying a driving route according to an example embodiment.
Figure 7B:
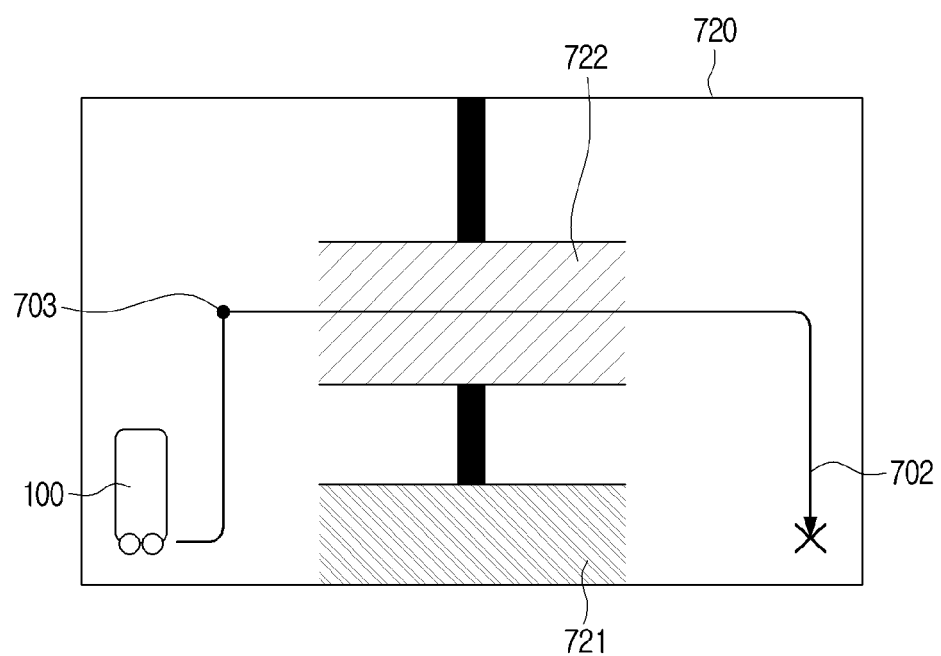

FIGS. 7A and 7B are diagrams illustrating a method of identifying a driving route according to an example embodiment.

According to FIG. 7A, the robot 100 may provide a service while driving in a space 710. For example, the robot 100 may provide a service corresponding to a pre-allotted task while driving to a destination X from the current location.

Also, the robot 100 may acquire information for a route 701 for driving to the destination. For example, the processor 140 may identify the driving route 701 based on the current location information of the robot 100, the location information of the destination, and information on objects 711, 713, etc. included in the space 710.

Specifically, in the space 710, a step 711 for moving downstairs may be included. The robot 100 according to an embodiment may acquire tilt information of an area corresponding to the step 711 and location information of a boundary area based on a depth image acquired through the 3D depth sensor 120. For example, the robot 100 may identify the point where the step 711 starts as the boundary area, and identify that the tilt information of the step 711 is less than 0 degree, and identify that the area corresponding to the step 711 is a cliff type.

In this case, the processor 140 may set an area within a threshold distance from the step 711 as a safe area 712 for preventing the robot 100 from being damaged during a driving process. Also, the processor 140 may control the driving part 110 such that the robot 100 does not drive in the safe area 712. Further, the processor 140 may identify that an area corresponding to an obstacle 713 located on the bottom surface is a wall type, and control the driving part 110 such that the robot 100 avoids the obstacle 713.

The processor 140 according to an embodiment may identify a driving route 701 where the robot 100 can reach the destination while avoiding the safe area 712 and the obstacle 713, and control the driving part 110 such that the robot 100 drives based on the identified driving route 701. Ultimately, the robot 100 may drive more safely according to a route identified in consideration of even the safe area 712 but not the shortest route to reach the destination when considering only the step 711 and the obstacle 713, and accordingly, damage to the hardware of the robot 100 can be prevented.

According to FIG. 7B, the robot 100 may provide a service while driving in a space 720. For example, the robot 100 may provide a service corresponding to a pre-allotted task while driving to a destination X from the current location.

Also, the robot 100 may acquire information for a route 702 for driving to the destination. For example, the robot 100 may identify the driving route 702 based on the current location information of the robot 100, the location information of the destination, and information on objects 721, 722, etc. included in the space 720.

Specifically, in the space 720, two tilted surfaces 721, 722 located between wall surfaces may be included. The robot 100 according to an embodiment may acquire tilt information of areas corresponding to the respective tilted surfaces 721, 722 and location information of boundary areas based on a depth image acquired through the 3D depth sensor 120. For example, the robot 100 may identify the points where the respective tilted surfaces 721, 722 start as the boundary areas, and identify that the first tilted surface 721 is a slope type having a degree of 40 degrees, and the second tilted surface 722 is a slope type having a degree of 20 degrees.

In this case, the processor 140 may identify a tilted surface that the robot 100 can climb. For example, the processor 140 may identify that the robot 100 cannot climb the first tilted surface 721, but can climb the second tilted surface 722, and acquire information on the driving route 702 where the robot 100 reaches the destination by climbing the second tilted surface 722 but not the first tilted surface 721.

Here, the information on the driving route 702 may include the tilt information of the tilted surface 722 that the robot 100 will climb, the location information of the boundary area, the information on the speed of the robot 100 that is necessary when climbing and a starting location 703 of acceleration, etc., but the disclosure is not limited thereto.

When the robot 100 reaches the starting location 703 of acceleration, the processor 140 may control the driving part 110 such that the robot 100 reaches the speed that is necessary when climbing before reaching the boundary area corresponding to the tilted surface 722. Ultimately, the robot 100 may drive based on the route 702 where the robot 100 can actually drive, and thus a delay of provision of a service as the robot 100 enters the area 721 where the robot 100 cannot drive can be prevented.

Figure 8:
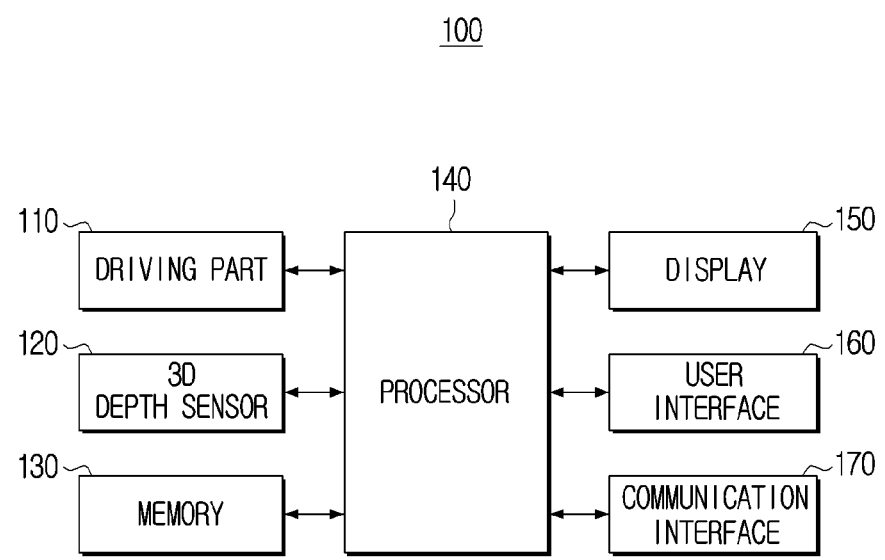
FIG. 8 is a diagram illustrating in detail a functional configuration of a robot according to an example embodiment.

FIG. 8 is a diagram illustrating in detail a functional configuration of a robot according to an example embodiment.

According to FIG. 8, the robot 100 may include a driving part 110, a 3D depth sensor 120, a memory 130, a processor 140, a display 150, a user interface 160, and a communication interface 170. Among the components illustrated in FIG. 8, regarding the components overlapping with the components illustrated in FIG. 1, detailed explanation will be omitted.

The display 150 may be implemented as displays in various forms such as a liquid crystal display (LCD), an organic light emitting diodes (OLED) display, a quantum dot light-emitting diodes (QLED) display, a plasma display panel (PDP), etc. Inside the display 150, driving circuits that may be implemented in forms such as a TFT, a low temperature poly silicon (LTPS) TFT, an organic TFT (OTFT), etc., a backlight unit, etc. may also be included. The display 150 may be implemented as a flexible display, a 3D display, etc.

The display 150 according to an embodiment may display information related to a service provided by the robot 100, or a user interface (UI) including the information.

The user interface 160 is a component that is involved when the robot 100 performs an interaction with a user. For example, the user interface 160 may include at least one of a touch sensor, a motion sensor, buttons, a jog dial, a switch, a microphone, or a speaker, but the disclosure is not limited thereto.

The user interface 160 according to an embodiment may receive a user command regarding provision of a service from a user, and the processor 140 may update task information necessary for provision of the service by the robot 100 based on the user command received through the user interface 160.

The communication interface 170 may input and output various types of data. For example, the communication interface 170 may transmit and receive various types of data with an external apparatus (e.g., a source apparatus), an external storage medium (e.g., a USB memory), and an external server (e.g., a web hard) through communication methods such as Wi-Fi based on AP (Wi-Fi, a wireless LAN network), Bluetooth, Zigbee, a wired/wireless local area network (LAN), a wide area network (WAN), Ethernet, IEEE 1394, a high-definition multimedia interface (HDMI), a USB, a mobile high-definition link (MHL), Audio Engineering Society/European Broadcasting Union (AES/EBU), optical, coaxial, etc.

The communication interface 170 according to an embodiment may receive a control signal related to provision of a service from an external apparatus, and the processor 140 may update the task information necessary for provision of the service by the robot 100 based on the control signal received through the communication interface 170.

Figure 9:
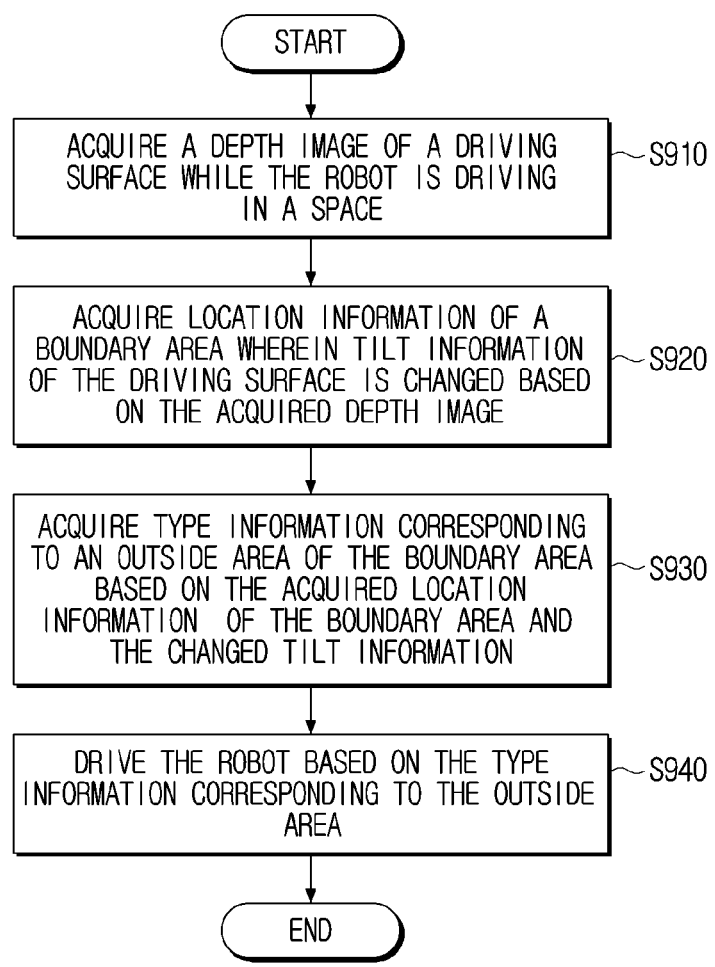
FIG. 9 is a flowchart illustrating a controlling method according to an example embodiment.

FIG. 9 is a flowchart illustrating a controlling method according to an example embodiment.

In a controlling method according to an embodiment of the disclosure, a depth image of a driving surface is acquired while the robot is driving in a space in operation S910.

Then, location information of a boundary area where tilt information of the driving surface is changed is acquired based on the acquired depth image in operation S920.

Then, type information corresponding to an outside area of the boundary area is acquired based on the acquired location information of the boundary area and the changed tilt information in operation S930.

Lastly, the robot may be driven based on the type information corresponding to the outside area in operation S940.

Here, the operation of acquiring the location information of the boundary area (operation S920) may include the operations of acquiring map data including a plurality of cells and height information corresponding to the plurality of respective cells based on the depth image, and acquiring the location information of the boundary area and the changed tilt information based on the height information of the respective cells included in the acquired map data.

Here, the operation of driving the robot (operation S940) may include the operations of mapping the type information to the respective cells included in the outside area and updating the map data, identifying a driving route of the robot based on the updated map data, and driving the robot based on the identified driving route.

Also, the operation of acquiring the type information (operation S930) may include the operations of grouping the plurality of respective cells into at least one group based on the height information of the plurality of respective cells included in the map data, identifying cells corresponding to the outside area based on the height information of the cells belonging to the at least one group, and identifying the type of the outside area based on the height information of the cells identified as the outside area.

In addition, the operation of acquiring the type information (operation S930) may include the operations of, based on the changed tilt information being smaller than a first threshold value, identifying the outside area as a cliff type, and based on the changed tilt information exceeding the first threshold value and being smaller than a second threshold value, identifying the outside area as a slope type, and based on the changed tilt information being greater than or equal to the second threshold value, identifying the outside area as a wall type.

Here, in the operation of acquiring the type information (operation S930), in case depth information corresponding to the outside area is not acquired based on the depth image, it may be identified that the changed tilt information is smaller than the first threshold value.

Also, in the operation of driving the robot (operation S940), if the outside area is identified as a cliff type, an area within a threshold distance from the boundary area may be set as a safe area, and the robot may be driven such that the robot does not drive in the safe area.

Also, the operation of driving the robot (operation S940) may include the operations of, based on the outside area being identified as the slope type, identifying whether the outside area can be climbed by the robot based on tilt information corresponding to the outside area, and based on the outside area being identified as a climbable area, driving the robot such that the speed of the robot increases based on reaching the threshold distance from the boundary area.

Here, in the operation of driving the robot (operation S940), if the outside area is identified as a non-climbable area, the robot may be driven such that the robot drives based on a route avoiding the outside area.

The methods according to the aforementioned various embodiments of the disclosure may be implemented in forms of applications that can be installed on conventional robots.

Also, the methods according to the aforementioned various embodiments of the disclosure may be implemented just with software upgrade, or hardware upgrade of conventional robots.

In addition, the aforementioned various embodiments of the disclosure may be performed through an embedded server provided on a robot, or at least one external server.

The aforementioned various embodiments of the disclosure may be implemented in a recording medium that can be read by a computer or an apparatus similar to a computer, by using software, hardware, or a combination thereof. In some cases, the embodiments described in this specification may be implemented as the processor 140 itself. According to implementation by software, the embodiments such as processes and functions described in this specification may be implemented as separate software modules. Each of the software modules can perform one or more functions and operations described in this specification.

Computer instructions for executing the processing operations of the robot 100 according to the aforementioned various embodiments of the disclosure may be stored in a non-transitory computer-readable medium. Such computer instructions stored in a non-transitory computer-readable medium may make the processing operations at the robot 100 according to the aforementioned various embodiments performed by a specific machine, when they are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact disc (CD), a digital versatile disc (DVD), a hard disc, a blue-ray disc, a USB, a memory card, a ROM and the like.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A robot comprising:
   a driving part;
   a three dimensional (3D) depth sensor;
   a memory storing instructions; and
   a processor connected to the driving part, the 3D depth sensor, and the memory,
   wherein the processor is configured to execute the instructions to:
     acquire a depth image of a driving surface photographed by the 3D depth sensor while the robot is driving in a space,
     acquire, based on the acquired depth image, location information of a boundary area by:
       acquiring map data comprising a plurality of cells and height information corresponding to the plurality of cells based on the depth image, and
       grouping the plurality of cells into a first group having a first value, a second group having a second value different from the first value, and a third group having a third value different from the first value and the second value,
     determine changed tilt information of the boundary area based on differences between the first value, the second value and the third value,
     acquire type information corresponding to an outside area of the boundary area based on the acquired location information of the boundary area and the changed tilt information, and
     control the driving part based on the type information.

2. The robot of claim 1, wherein the processor is further configured to execute the instructions to:
   acquire the location information of the boundary area and the changed tilt information based on the height information of the plurality of cells of the acquired map data.

3. The robot of claim 2, wherein the processor is further configured to execute the instructions to:
   map the type information to the plurality of cells of the outside area,
   update the map data,
   identify a driving route of the robot based on the updated map data, and
   control the driving part based on the identified driving route.

4. The robot of claim 2, wherein the processor is further configured to execute the instructions to:
   group the plurality of cells into at least one group based on the height information of the plurality of cells included in the map data,
   identify cells corresponding to the outside area based on the height information of cells belonging to the at least one group, and
   identify a type of the outside area based on the height information of the cells identified as corresponding to the outside area.

5. The robot of claim 1, wherein the processor is further configured to execute the instructions to:
   based on the changed tilt information being less than a first threshold value, identify the outside area as a cliff type,
   based on the changed tilt information exceeding the first threshold value and being less than a second threshold value, identify the outside area as a slope type, and
   based on the changed tilt information being greater than or equal to the second threshold value, identify the outside area as a wall type.

6. The robot of claim 5, wherein the processor is further configured to execute the instructions to:
   based on depth information corresponding to the outside area not being acquired based on the depth image, identify that the changed tilt information is less than the first threshold value.

7. The robot of claim 5, wherein the processor is further configured to execute the instructions to:
   based on the outside area being identified as the cliff type, set an area within a threshold distance from the boundary area as a safe area and control the driving part such that the robot does not drive into the safe area.

8. The robot of claim 5, wherein the processor is further configured to execute the instructions to:
   based on the outside area being identified as the slope type, identify whether the outside area can be climbed by the robot based on tilt information corresponding to the outside area, and
   based on the outside area being identified as a climbable area, control the driving part such that a speed of the robot increases based on reaching a threshold distance from the boundary area.

9. The robot of claim 8, wherein the processor is further configured to execute the instructions to:
   based on the outside area being identified as a non-climbable area, control the driving part such that the robot drives based on a route avoiding the outside area.

10. A non-transitory computer-readable recording medium storing instructions that, when executed by a processor of a robot, cause the processor to:
 acquire a depth image of a driving surface while the robot is driving in a space;
 acquire, based on the acquired depth image, location information of a boundary area by:
  acquiring map data comprising a plurality of cells and height information corresponding to the plurality of cells based on the depth image, and
  grouping the plurality of cells into a first group having a first value, a second group having a second value different from the first value, and a third group having a third value different from the first value and the second value,
 determine changed tilt information of the boundary area based on differences between the first value, the second value and the third value,
 acquire type information corresponding to an outside area of the boundary area based on the acquired location information of the boundary area and the changed tilt information; and
 drive the robot based on the acquired type information.

11. A controlling method of a robot, the method comprising:
 acquiring a depth image of a driving surface while the robot is driving in a space;
 acquiring, based on the acquired depth image, location information of a boundary area by:
  acquiring map data comprising a plurality of cells and height information corresponding to the plurality of cells based on the depth image, and
  grouping the plurality of cells into a first group having a first value, a second group having a second value different from the first value, and a third group having a third value different from the first value and the second value,
 determining changed tilt information of the boundary area based on differences between the first value, the second value and the third value,
 acquiring type information corresponding to an outside area of the boundary area based on the acquired location information of the boundary area and the changed tilt information; and
 driving the robot based on the acquired type information.

12. The controlling method of claim 11, wherein the acquiring the location information of the boundary area comprises:
 acquiring the location information of the boundary area and the changed tilt information based on the height information of the plurality of cells of the acquired map data.

13. The controlling method of claim 12, wherein the driving the robot comprises:
 mapping the type information to cells included in the outside area,
 updating the map data;
 identifying a driving route of the robot based on the updated map data; and
 driving the robot based on the identified driving route.

14. The controlling method of claim 12, wherein the acquiring the type information corresponding to the outside area comprises:
 grouping the plurality of cells into at least one group based on the height information of the plurality of cells of the map data;
 identifying cells corresponding to the outside area based on height information of cells belonging to the at least one group; and
 identifying a type of the outside area based on the height information of the cells identified as the outside area.

15. The controlling method of claim 11, wherein the acquiring the type information corresponding to the outside area comprises:
 based on the changed tilt information being less than a first threshold value, identifying the outside area as a cliff type;
 based on the changed tilt information exceeding the first threshold value and being smaller than a second threshold value, identifying the outside area as a slope type; and
 based on the changed tilt information being greater than or equal to the second threshold value, identifying the outside area as a wall type.

16. An apparatus, comprising:
 a driving component;
 a memory storing instructions; and
 a processor configured to execute the instructions to:
  acquire a depth image of a driving surface,
  acquire, based on the acquired depth image, location information of a boundary area by:
   acquiring map data comprising a plurality of cells and height information corresponding to the plurality of cells based on the depth image, and
   grouping the plurality of cells into a first group having a first value, a second group having a second value different from the first value, and a third group having a third value different from the first value and the second value,
  determine changed tilt information of the boundary area based on differences between the first value, the second value and the third value,
  acquire type information of an outside area of the boundary area based on the acquired location information and the changed tilt information, and
  control the driving component based on the acquired type information.

17. The apparatus of claim 16, wherein the processor is further configured to execute the instructions to:
 acquire the location information of the boundary area and the changed tilt information based on the height information.

18. The apparatus of claim 17, wherein the processor is further configured to execute the instructions to:
 map the type information to the plurality of cells of the outside area,
 update the map data,
 identify a driving route of the apparatus based on the updated map data, and
 control the driving component based on the identified driving route.

19. The apparatus of claim 17, wherein the processor is further configured to execute the instructions to:
 group the plurality of cells into at least one group based on the height information,
 identify cells corresponding to the outside area based on the height information of cells belonging to the at least one group, and
 identify a type of the outside area based on the height information of the cells identified as corresponding to the outside area.

20. The apparatus of claim 16, wherein the processor is further configured to execute the instructions to:

based on the changed tilt information being less than a first threshold value, identify the outside area as a cliff type, based on the changed tilt information exceeding the first threshold value and being less than a second threshold value, identify the outside area as a slope type, and based on the changed tilt information being greater than or equal to the second threshold value, identify the outside area as a wall type.

* * * * *